(No Model.)
D. C. SCHLABACH.
SAW
No. 481,201. Patented Aug. 23, 1892.
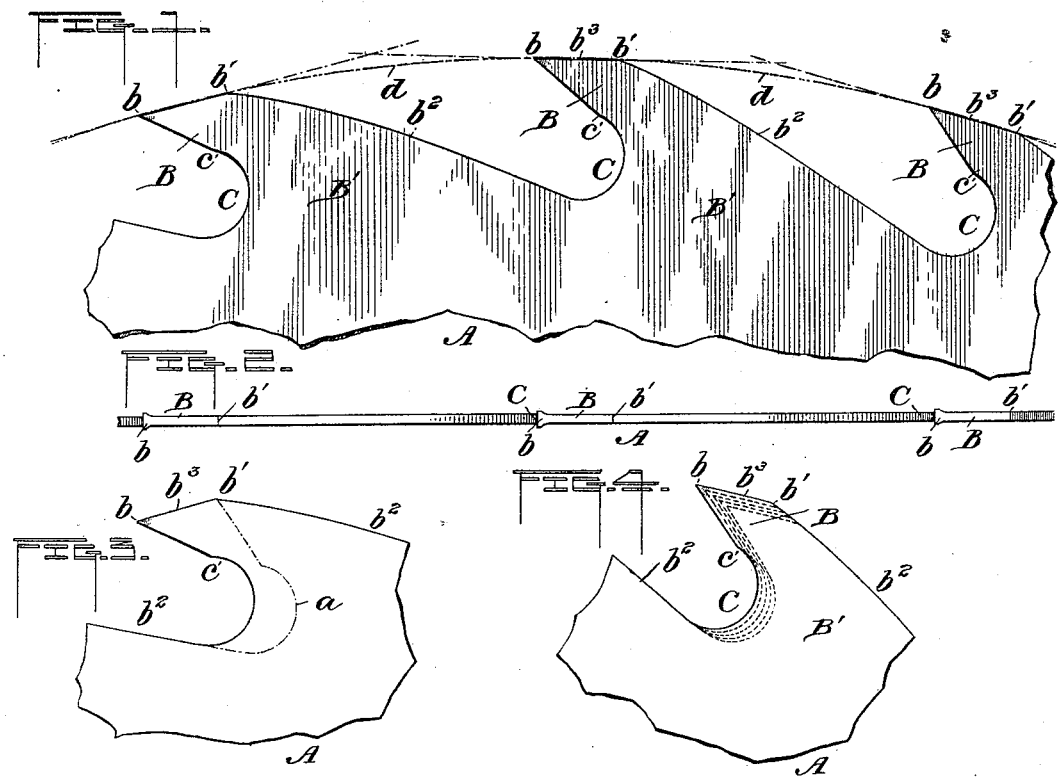

UNITED STATES PATENT OFFICE.

DANIEL C. SCHLABACH, OF FARMERSTOWN, OHIO.

SAW.

SPECIFICATION forming part of Letters Patent No. 481,201, dated August 23, 1892.

Application filed December 8, 1891. Serial No. 414,378. (No model.)

*To all whom it may concern:*

Be it known that I, DANIEL C. SCHLABACH, a citizen of the United States, residing at Farmerstown, in the county of Holmes and State of Ohio, have invented certain new and useful Improvements in Saws; and I do hereby declare the following to be a full, clear, and exact description of the invention, such as will enable others skilled in the art to which it appertains to make and use the same.

This invention relates to improvements in circular saws, and particularly to the method of forming the saw-teeth; and its object is to provide a durable and efficient circular saw having teeth of proper strength to resist the strain to which they are subjected in operation, and which at the same time may be chambered out and pointed, so as to operate with the least possible expenditure of power, the teeth being formed with points which will cut into the timber like a chisel without scraping or tearing the wood and without bending or binding in the kerf.

Heretofore saws have been made with teeth having chisel-like points; but instead of forming the teeth so as to present the points thereof to the wood after the manner of using an ordinary hand-tool, so as to cause the saw to cut its way into the wood by paring off or shaving the wood, the points of the teeth are made to project from a long shank or body in such relation to the saw plate or blade that lines drawn parallel with the upper and lower edges of the points will intersect a circle touching the extreme ends of the teeth at an acute angle thereto, and the result is that in operation the kerf is cut by tearing and scraping the wood, thus subjecting the teeth to great strain, which frequently results in their being bent or broken and also tends to warp the shank or main body of the tooth, so as to cause the saw to bind in the kerf and soon become heated by the friction thus produced. To overcome these difficulties, I have devised a tooth of improved construction, as hereinafter set forth.

The invention will first be described in connection with the accompanying drawings, and then particularly pointed out in the claims at the end of this description.

Referring to the drawings, Figure 1 represents a side view of a portion of a saw-plate illustrating my invention. Fig. 2 is a plan of the same. Fig. 3 is a detail of one of the teeth, illustrating in dotted lines the shape of teeth of the usual construction. Fig. 4 is a detail of a tooth, illustrating in dotted lines the results of successive filings.

Like letters of reference are used to denote like parts in each of the several views.

A denotes a portion of a saw plate or blade, having the teeth B preferably formed integral therewith.

In Fig. 3 my improved tooth is shown in full lines, while the dotted line $a$ indicates the form of a tooth of the usual construction.

In forming the teeth B the peripheral portion or edge of the circular plate or blade may be divided into as many portions as it is desired to form teeth thereon, according to the size of the blade, and the metal is filed or ground so as to form the tooth with a main portion or body $B'$, which terminates in a triangular point, the back or upper edge $b^3$ of which forms the chord of a circle touching the extreme ends or points $b$ of the teeth of the blade, as indicated by the dotted line $d$ in Fig. 1, this portion or back $b^3$ being preferably about three-fourths of an inch in length and about one-fifth as long as the rear curved edge $b^2$ of the main body of the tooth from the heel $b'$ to the concave C of the gullet. The straight edge or back $b^3$ of the tooth, from the point $b$ to the heel $b'$, is of less length than the lower front edge from $b'$ to $c'$, and back of the part $c'$ the recess forming the gullet is concaved, as shown, to provide sufficient clearance at this point. By this construction the metal forming the tooth is distributed so as to afford sufficient strength in the main portion or body $B'$ of the tooth where the greatest strength is required to resist the strain upon the tooth and prevent the latter from being warped, while the point is provided with the necessary thickness of metal between the heel thereof and the gullet without waste of metal and consequent weakening of the tooth when made in the usual form; and owing to the straight edge or back of the tooth being disposed as described the saw will cut through the wood without tearing and scraping, as is usual with saws in common use. By means of a suitable gage the teeth of the saw may may be reduced by successive filings, as indicated by the dotted lines in Fig. 4, without changing the inclination of the point or its configuration, the original contour of the tooth being retained and the efficiency of the saw preserved throughout successive filings.

Having thus described my invention, what I claim as new, and desire to secure by Letters Patent, is—

1. A circular saw comprising a blade provided with triangular teeth whose backs or upper edges form chords of a circle touching the points of all the teeth, the upper edge or back of the main portion or body which supports the tooth proper extending in a gentle curve from the heel of the tooth to the return bend of the gullet, substantially as described, and for the purpose set forth.

2. A saw-blade having its teeth formed integrally therewith, each tooth being provided with a main portion or body whose rear curved edge or back extends in a gradual curve from the heel of the point to the base of the gullet of the next tooth in rear thereof, and terminating in a triangular point whose back or upper edge forms the chord of a circle touching the extreme ends or points of the teeth in the circle, whereby the metal forming the tooth is distributed so as to afford the greatest strength where required to resist strains tending to warp the blade, while the point is provided with the desired thickness of metal between the heel thereof and the gullet, substantially as described.

In testimony whereof I affix my signature in presence of two witnesses.

DANIEL C. SCHLABACH.

Witnesses:
BENJAMIN HELMUTH,
GEORGE W. PRICE.